(12) United States Patent
Yada

(10) Patent No.: US 12,050,819 B2
(45) Date of Patent: Jul. 30, 2024

(54) MANAGEMENT SYSTEM, COMPUTER READABLE MEDIUM, AND MANAGEMENT METHOD

(71) Applicant: BROTHER KOGYO KABUSHIKI KAISHA, Nagoya (JP)

(72) Inventor: Yuki Yada, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/933,878

(22) Filed: Sep. 21, 2022

(65) Prior Publication Data

US 2023/0141647 A1 May 11, 2023

(30) Foreign Application Priority Data

Nov. 5, 2021 (JP) ................................. 2021-181399

(51) Int. Cl.
*G06F 3/12* (2006.01)

(52) U.S. Cl.
CPC ............ *G06F 3/121* (2013.01); *G06F 3/1234* (2013.01); *G06F 3/1236* (2013.01); *G06F 3/1285* (2013.01)

(58) Field of Classification Search
CPC ...... G06F 3/121; G06F 3/1234; G06F 3/1236; G06F 3/1285
See application file for complete search history.

(56) References Cited

U.S. PATENT DOCUMENTS

| | | | |
|---|---|---|---|
| 2007/0174419 A1* | 7/2007 | O'Connell | G06F 11/0781 709/217 |
| 2007/0288623 A1 | 12/2007 | Kato et al. | |
| 2011/0134472 A1* | 6/2011 | Kimura | G06F 3/1203 358/1.15 |
| 2011/0279850 A1* | 11/2011 | Horiuchi | G06F 3/1285 358/1.14 |
| 2018/0089044 A1* | 3/2018 | Guim Bernat | G06F 12/1425 |

(Continued)

FOREIGN PATENT DOCUMENTS

| | | |
|---|---|---|
| JP | 2008004072 A | 1/2008 |
| JP | 2018125005 A | 8/2018 |
| JP | 2019148957 A | 9/2019 |

*Primary Examiner* — Helen Zong
(74) *Attorney, Agent, or Firm* — Scully, Scott, Murphy & Presser, PC

(57) ABSTRACT

A management system includes a first communication device and a second communication device. The second communication device is configured to execute a terminal information acquisition process of acquiring terminal information related to terminal devices and a writing process of writing execution information into a cloud storage in response to execution of the terminal information acquisition process. The execution information includes the terminal information and is related to the terminal information acquisition process. The first communication device is configured to execute an execution information acquisition process of acquiring, from the cloud storage, the execution information and an error determination process of determining whether an error state occurs based on the execution information. The error state indicates that one piece of the terminal information of the terminal devices included in the execution information may not correspond to an execution timing of the execution information acquisition process.

10 Claims, 9 Drawing Sheets

(56) References Cited

U.S. PATENT DOCUMENTS

| | | | |
|---|---|---|---|
| 2019/0171887 A1* | 6/2019 | Iwamoto | H04N 23/698 |
| 2021/0224107 A1* | 7/2021 | Vassenkov | H04L 67/10 |
| 2021/0337405 A1* | 10/2021 | Sato | H04W 8/24 |
| 2022/0108564 A1* | 4/2022 | O'Sullivan | G07C 5/0816 |

* cited by examiner

FIG. 5

SCHEDULED TASK TABLE (EACH DEVICE)

| PROPERTY | FIRST KEY | SECOND KEY | REQUEST PARAMETER | RESPONSE PARAMETER | NOTIFICATION SOURCE | MANAGE-MENT STATUS | DEVICE ID | TIME STAMP |
|---|---|---|---|---|---|---|---|---|
| | | | | | | | | ...... |
| VALUE | LOG | | | [PROCESS RESULT; OID/VALUE] ※1 | DEVICE or CLIENT | | | ddmmyy |
| | STATUS | [DEVICE ID] | | [PROCESS RESULT; OID/VAL-UE] | DEVICE or CLIENT | | | ddmmyy |
| | REGISTRATION | | | [PROCESS RESULT; OID/VAL-UE] ※2 (・STATUS INFORMATION ・FINAL UPDATE TIME Tref) | DEVICE or CLIENT | | | ddmmyy |

REQUEST PARAMETER (JSON)
```
{
  "x.x.x.x.x": "......",
  "%MIB(x.x.x.x.x ...... )%": "......",
  "y.y.y.y.y": "......",
  "%MIB(y.y.y.y.y ...... )%": "......",
  ...
}
```

⇑ EXECUTION OF PROCESS

RESPONSE PARAMETER (JSON)
```
{
  "x.x.x.x.x": "......",
  "3101040000000132010000001ff": "......",
  "y.y.y.y.y": "4"
}
```

※1: DATA EXAMPLE

※2: CASE OF TERMINAL DEVICE SUBORDINATE TO CLIENT

FIG. 6

CLIENT SETTING TABLE

| PROPERTY | FIRST KEY | SECOND KEY | REQUEST PARAMETER | RESPONSE PARAMETER | NOTIFICATION SOURCE | MANAGEMENT STATUS | DEVICE ID |
|---|---|---|---|---|---|---|---|
| VALUE | CLIENT STATUS | [CLIENT ID] | | | [CLIENT NAME] | • SEARCH START TIME Tst<br>• SEARCH END TIME Ten | |
| | ...... | | | | | | ...... |

MANAGEMENT SYSTEM, COMPUTER READABLE MEDIUM, AND MANAGEMENT METHOD

REFERENCE TO RELATED APPLICATIONS

This application claims priority from Japanese Patent Application No. 2021-181399 filed on Nov. 5, 2021. The entire content of the priority application is incorporated herein by reference.

BACKGROUND ART

A system in which a management device manages an image forming device via a server is disclosed in a related art. In the system, when a server device acquires predetermined information from the image forming device, the server device transmits the information to the management device.

DESCRIPTION

In the above system, the server device actively operates. That is, as illustrated in acquisition and transmission of the above predetermined information, the server device itself actively performs various determination processes and notifies the management device or the image forming device of a process result. Therefore, a cost for operating the server device increases.

For some reason, a situation may occur in which the management device is not able to properly acquire information about the image forming device from the server device. An example of such a situation includes a situation in which the server device and the image forming device is not able to normally communicate with each other. When such a situation occurs, the management device may not be able to acquire proper information from the server device.

Therefore, an object of an aspect of the present disclosure is to enable a management device to properly manage a terminal device while reducing an operation cost of an intermediate device in a system in which the management device manages the terminal device via the intermediate device.

A management system according to an aspect of the present disclosure includes a first communication device and a second communication device. The first communication device and the second communication device are configured to access a cloud storage. The second communication device is configured to at least one of terminal devices.

The second communication device is configured to execute a terminal information acquisition process and a writing process. The terminal information acquisition process is to acquire terminal information from each of the at least one of the terminal devices. The terminal information is related to the terminal devices.

The writing process is executed in response to execution of the terminal information acquisition process. The writing process includes writing execution information into the cloud storage. The execution information is related to the executed terminal information acquisition process, and includes the terminal information acquired by the terminal information acquisition process.

The first communication device executes an execution information acquisition process and an error determination process. The execution information acquisition process is a process of acquiring, from the cloud storage, the execution information written into the cloud storage.

The error determination process is a process of determining whether an error state occurs based on the execution information acquired by the execution information acquisition process. The error state is a state where there is a possibility that one piece of the terminal information of the at least one of the terminal devices included in the execution information acquired by the execution information acquisition process does not corresponds to an execution timing of the execution information acquisition process. A case where the terminal information is not the proper information may also include a case where the terminal information is not able to be acquired in the first place.

In such a management system, the cloud storage passively functions relative to the first communication device and the second communication device. That is, the execution information is written into the cloud storage by the second communication device. The cloud storage itself does not voluntarily transmit the written execution information to the first communication device. The written execution information is acquired (that is, read) by the first communication device. Therefore, an operation cost of the cloud storage may be reduced.

Further, in a case where the first communication device acquires the execution information from the cloud storage, the first communication device executes the error determination process based on the acquired execution information. As a result, if the error state occurs, the first communication device may recognize, by the error determination process, that the error state occurs. Therefore, the first communication device may acquire proper terminal information from the cloud storage, and thus may properly manage each terminal device.

The terminal information may include any information related to the terminal device. For example, the terminal information may include information (for example, unique information) indicating the terminal device, information indicating a state or an operation state of the terminal device, and the like. The terminal information may include, for example, a time at which the terminal information is acquired from the terminal device.

The execution information may include any information related to the executed terminal information acquisition process. For example, the execution information may include only the terminal information, or may include other information in addition to the terminal information. The other information may include, for example, a start time and/or an end time of the terminal information acquisition process.

A specific state determined as the error state by the error determination process may be determined in any manner. For example, the error state may include a state where the second communication device is not able to normally write the execution information into the cloud storage (specifically, for example, a state where the second communication device is not able to normally communicate with the cloud storage). For example, the error state may include a state where the second communication device is not able to normally acquire the terminal information from the terminal device (specifically, for example, a state where the second communication device is not able to normally communicate with the terminal device).

According to another aspect of the present disclosure, there may be provided a first communication device or a second communication device that constitutes the above management system. According to still another aspect of the present disclosure, there may be provided a management program that is a computer program for causing a computer to function as a first communication device, and a computer program for causing a computer to function as a second communication device. According to still another aspect of the present disclosure, there may be provided a method used in the above management system, a method used in the first communication device in the above system, and a method used in the second communication device in the above system.

FIG. 5 is an explanatory diagram showing an example of a scheduled task table.

FIG. 6 is an explanatory diagram showing an example of a client setting table.

Figure 1:
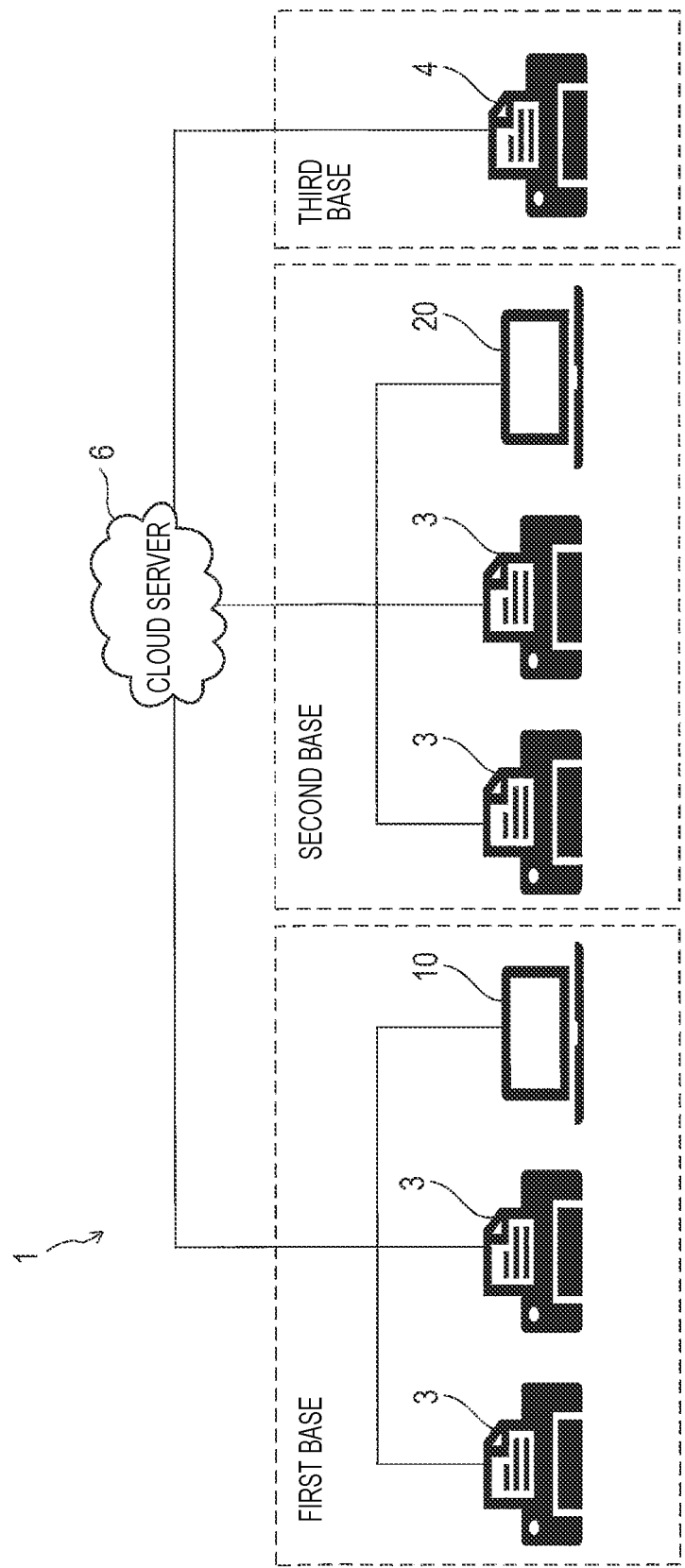
FIG. 1 is a configuration diagram showing a management system according to an embodiment.

Hereinafter, an exemplary embodiment of the present disclosure will be described with reference to the drawings.

1. EMBODIMENT

(1-1) Overall Configuration

A management system 1 according to the exemplary embodiment of the present disclosure is a network system configured to manage terminal devices 3 and 4 via a cloud server 6 by cooperation of a master 10 and a client 20, and the terminal devices 3 and 4 are disposed in a plurality of bases.

The master 10 illustrated in FIG. 1 may communicate, via a local area network, with one or more terminal devices 3 installed in a first base. Further, the master 10 may communicate with the cloud server 6 via a wide area network.

The client 20 may communicate, via a local area network, with one or more terminal devices 3 installed in a second base. Further, the client 20 may communicate with the cloud server 6 via a wide area network. The terminal device 4 installed in a third base may communicate with the cloud server 6 via a wide area network.

The local area network may include, for example, at least one of a wireless LAN and a wired LAN. The wide area network may include, for example, the Internet. A local area network may be constructed in the third base. In this case, the terminal device 4 may be connected to the wide area network via the local area network in the third base.

Each of the terminal devices 3 cannot use a cloud service provided by the cloud server 6. In other words, each of the terminal devices 3 does not have a function of communicating with the cloud server 6. Hereinafter, the terminal device 3 is particularly referred to as a first type terminal device 3. On the other hand, the terminal device 4 is a terminal device that may use a cloud service provided by the cloud server 6. In other words, the terminal device 4 has a function of communicating with the cloud server 6. Hereinafter, the terminal device 4 is particularly referred to as a second type terminal device 4.

The first type terminal device 3 installed in the second base is managed by the master 10 via the client 20 and the cloud server 6. The second type terminal device 4 installed in the third base is managed by the master 10 via the cloud server 6 rather than via the client 20.

The terminal devices 3 and 4 managed by the master 10 may be, for example, a group of terminal devices managed by an organization such as a company. In this case, the bases may be activity bases of the organization. For example, the first base where the master 10 is present may be an office of an organization management department. The other second and third bases may be branch offices of the organization separated from the first base.

Examples of the terminal devices 3 and 4 include a printer, a scanner, a digital multifunction device in which these functions are integrated, and the like. The master 10 and the client 20 are each implemented, for example, by installing a dedicated computer program in a personal computer.

(1-2) Device Configuration

Figure 2A:
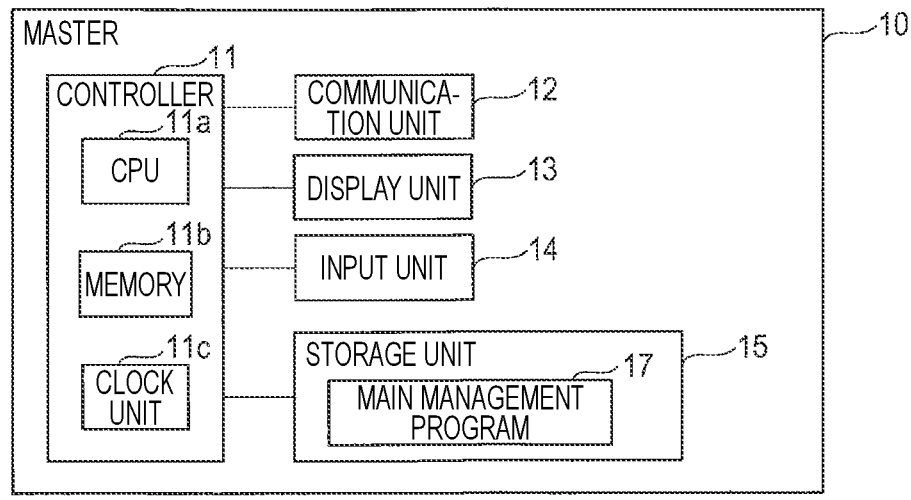
FIG. 2A is a block diagram of a master.

The master 10 shown in FIG. 2A includes a controller 11, a communication unit 12, a display unit 13, an input unit 14, and a storage unit 15. The controller 11 includes a CPU 11a, a memory 11b, and a clock unit 11c. The CPU 11a serving as a processor executes a process in accordance with a computer program stored in the storage unit 15. The memory 11b is used as a work memory in a case where the above process is executed.

The storage unit 15 includes, for example, a storage such as a solid state drive (SSD) and a hard disk drive (HDD), and stores various computer programs and data. The storage unit 15 stores a main management program 17. The main management program 17 is a computer program for causing the CPU 11a to implement a management function to be implemented by the master 10. It may be understood that a process executed by the controller 11, which is to be described below, is implemented by the process executed by the CPU 11a in accordance with the computer program.

The clock unit 11c outputs a current time (specifically, a signal or data indicating the current time). The clock unit 11c may include, for example, a real time clock. The current time output by the clock unit 11c includes, for example, year, month, day, hour and minute. However, the clock unit 11c may output the current time in any form. For example, the current time may include second, or may include day of week. For example, the year may be omitted, or the year and the month may be omitted. The current time output by the clock unit 11c is hereinafter referred to as a "master current time Tm".

The communication unit 12 is connected to the local area network in the base where the master 10 is present, and is further connected to the wide area network. The communication unit 12 may be connected to the wide area network via a router (not shown).

The display unit 13 displays various screens for a user who operates the master 10. Examples of the display unit 13 include a liquid crystal display. Examples of the various screens include a device management screen. The device management screen is a so-called portal screen in the management function implemented by the master 10. Basically, a main administrator who is the user of the master 10 may manage the terminal devices 3 and 4 to be managed by performing various input operations or browsing various types of information with the device management screen as a starting point. For example, a list indicating an operation state, log information, status information, and the like of each of the terminal devices 3 and 4 to be managed may be displayed on the device management screen.

The input unit 14 includes one or more input devices via which an operation signal from the user who operates the master 10 is input, such as a keyboard and a pointing device. Specifically, the input unit 14 may include, for example, a mouse. For example, the input unit 14 may include a touch panel. The touch panel may be disposed so as to overlap with all or substantially all of an area of the display unit 13 in which an image is displayed. The controller 11 operates in accordance with an operation signal input via the input unit 14.

Figure 2B:
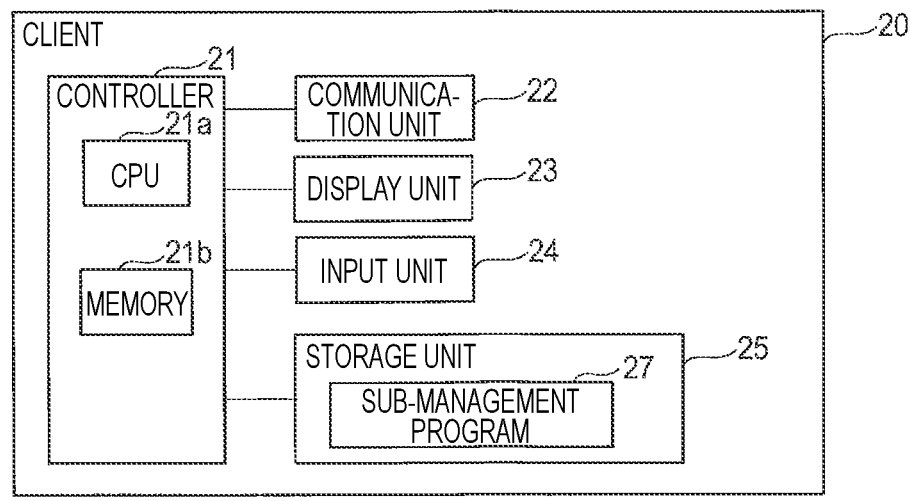
FIG. 2B is a block diagram of a client.

The client 20 shown in FIG. 2B includes a controller 21, a communication unit 22, a display unit 23, an input unit 24, and a storage unit 25. The controller 21 includes a CPU 21*a* and a memory 21*b*. The CPU 21*a* serving as a processor executes a process in accordance with a computer program stored in the storage unit 25.

The storage unit 25 stores a sub-management program 27. The sub-management program 27 is a computer program for causing the CPU 21*a* to implement a function related to the management function of the master 10, which is to be implemented by the client 20. It may be understood that a process executed by the controller 21, which is to be described below, is implemented by the process executed by the CPU 21*a* in accordance with the computer program.

The communication unit 22 is connected to the local area network in the base where the client 20 is present, and is further connected to the wide area network. The communication unit 22 may be connected to the wide area network via a router (not shown). The display unit 23 includes, for example, a liquid crystal display, and displays various screens for a user who operates the client 20. The input unit 24 includes one or more input devices via which an operation signal from the user who operates the client 20 is input. The controller 21 operates in accordance with an operation signal input via the input unit 24.

Figure 2C:
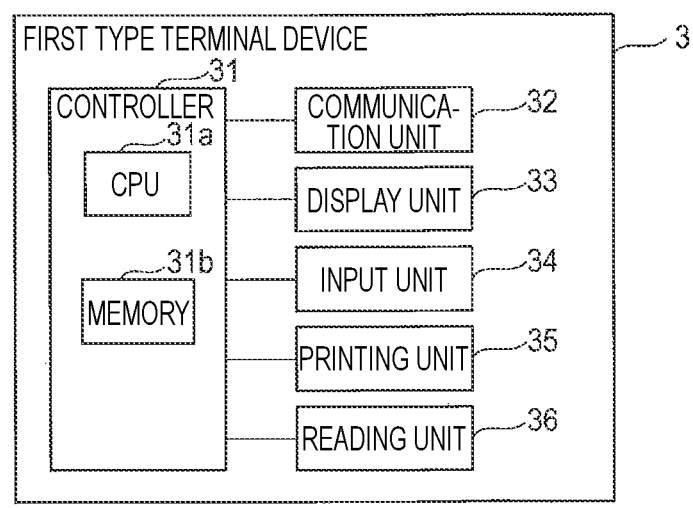
FIG. 2C is a block diagram of a first type terminal device.

The first type terminal device 3 shown in FIG. 2C includes a controller 31, a communication unit 32, a display unit 33, and an input unit 34. In a case where the first type terminal device 3 is, for example, the digital multifunction device, the first type terminal device 3 may further include a printing unit 35 and a reading unit 36. The first type terminal device 3 may include only one of the printing unit 35 and the reading unit 36.

The controller 31 includes a CPU 31*a* and a memory 31*b*. The memory 31*b* may include a nonvolatile memory such as a flash memory in addition to a RAM, and the nonvolatile memory may store a computer program, setting data, and the like.

The CPU 31*a* serving as a processor executes overall control of the entire first type terminal device by executing a process in accordance with a computer program stored in the memory 31*b*. It may be understood that a process executed by the controller 31, which is to be described below, is implemented by the process executed by the CPU 31*a* in accordance with the computer program.

The communication unit 32 is connected to the local area network in the base where the first type terminal device 3 is present, so that the communication unit 32 may communicate with the master 10 or the client 20 present in the base. The display unit 33 includes, for example, a liquid crystal display, and displays various screens for a user who operates the first type terminal device 3. The input unit 34 includes one or more input devices such as a touch panel on the liquid crystal display in order to input an operation signal from the user.

The printing unit 35 prints an image on a sheet under control of the controller 31. Examples of the printing unit 35 include an inkjet printer and a laser printer. According to the present embodiment, by a method to be described later, status information such as a remaining amount of a color material and log information such as the number of printed sheets are written from the first type terminal device 3 through the client 20 into the cloud server 6 and are then provided to the master 10. The reading unit 36 reads a reading target image on a printed matter or the like under control of the controller 31.

Figure 3A:
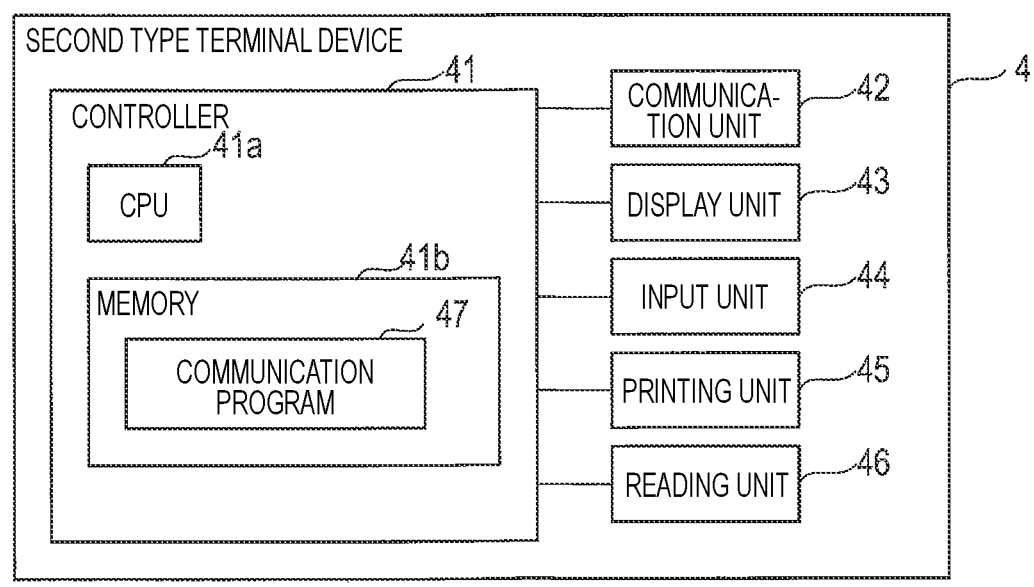
FIG. 3A is a block diagram of a second type terminal device.

The second type terminal device 4 shown in FIG. 3A includes a controller 41, a communication unit 42, a display unit 43, and an input unit 44. In a case where the second type terminal device 4 is, for example, the digital multifunction device, the second type terminal device 4 may further include a printing unit 45 and a reading unit 46. The second type terminal device 4 may include only one of the printing unit 45 and the reading unit 46.

The controller 41 includes a CPU 41*a* and a memory 41*b*. The memory 41*b* may include a nonvolatile memory such as a flash memory, and the nonvolatile memory may store a computer program, setting data, and the like.

The CPU 41*a* serving as a processor executes overall control of the entire device by executing a process in accordance with a computer program stored in the memory 41*b*. The memory 41*b* stores a communication program 47. The communication program 47 is a program for using a cloud service provided by the cloud server 6. It may be understood that a process executed by the controller 41, which is to be described below, is implemented by the process executed by the CPU 41*a* in accordance with the computer program.

The communication unit 42 is connected to the wide area network, so that the communication unit 42 may communicate with the cloud server 6. In a case where the local area network is constructed in the third base, the communication unit 42 may be connected to the wide area network via the local area network. The display unit 43 includes, for example, a liquid crystal display. The input unit 44 includes one or more input devices via which an operation signal from a user is input.

The printing unit 45 prints an image on a sheet under control of the controller 41. According to the present embodiment, by a method to be described later, status information such as a remaining amount of a color material and log information such as the number of printed sheets are written from the second type terminal device 4 into the cloud server 6 and are then provided to the master 10. The reading unit 46 reads a reading target image on a printed matter or the like under control of the controller 41.

Figure 3B:
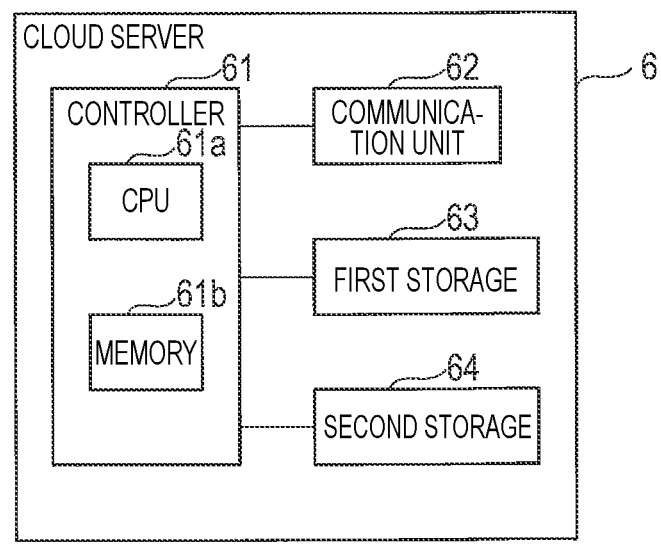
FIG. 3B is a block diagram of a cloud server.

The cloud server 6 shown in FIG. 3B includes a controller 61, a communication unit 62, a first storage 63, and a second storage 64. The controller 61 includes a CPU 61*a* and a memory 61*b*.

The CPU 61*a* serving as a processor executes a process in accordance with a computer program stored in the memory 61*b*. The process executed by the CPU 61*a* includes a process of causing the cloud server 6 to function as a cloud storage. It may be understood that a process executed by the controller 61, which is to be described below, is implemented by the process executed by the CPU 61*a* in accordance with the computer program.

The above cloud storage includes a table storage and an object storage. The controller 61 executes the above process, so that the first storage 63 functions as the table storage, and the second storage 64 functions as the object storage.

The exemplary first storage 63 functions as a NoSQL data store, and may store a table having a group of schema-less entities as constituent elements. Each of the entities in the table includes a set of properties, and each of the properties includes a pair of a key and a value.

The exemplary second storage 64 functions as the object storage into which any text file and binary file may be read and written as objects from an outside by using an HTTP/HTTPS protocol.

Azure of Microsoft Corporation is known as a cloud service that provides the table storage and the object storage described above. The cloud server 6 may operate in the same manner as such a cloud service. "Azure" is a registered trademark of Microsoft Corporation.

The cloud server 6 passively functions relative to the master 10, the client 20, and the second type terminal device 4. That is, the cloud server 6 itself does not actively execute a determination process or the like to issue instructions, requests, notifications, or the like to the master 10, the client 20, and the second type terminal device 4. Each of the master 10, the client 20, and the second type terminal device 4 writes necessary data into the cloud server 6 by itself as necessary. Each of the master 10, the client 20, and the second type terminal device 4 accesses the cloud server 6 and reads data stored in the cloud server 6 by itself as necessary.

The data written into the cloud server 6 by the master 10 may include, for example, data indicating various requests, notifications, or the like (hereinafter, abbreviated as "notifications or the like") directed to predetermined one or more devices of the first type terminal devices 3 and the second type terminal device 4. More specifically, the data indicating the notifications or the like is written, for example, into the first storage 63.

The master 10 writes the text file, the binary file, or the like into the second storage 64 as necessary. Specifically, for example, in a case where the master 10 writes, into the first storage 63, data indicating a task for instructing update of firmware in one or more particular first type terminal devices 3 and/or the second type terminal device 4, the master 10 writes, into the second storage 64, software (for example, an update program) necessary for executing the task (that is, updating the firmware).

The data read from the cloud server 6 by the client 20 may include, for example, data directed to the first type terminal device 3 subordinate to the client 20 among the above data indicating the notifications or the like. In other words, "subordinate to the client 20" broadly means being present within the local area network including the client 20 and being communicably connected to the client 20, and narrowly means being communicably connected to the client 20 and being registered as a management target in the client 20 (and thus in the master 10). In the present embodiment, for example, the first type terminal device 3 connected to the client 20 via the local area network in the second base is the first type terminal device 3 subordinate to the client 20. The client 20 may read, as necessary, a file written into the second storage 64.

The data read from the cloud server 6 by the second type terminal device 4 may include, for example, data directed to the second type terminal device 4 among the above data indicating the notifications or the like. The second type terminal device 4 may read, as necessary, a file written into the second storage 64.

The data written into the cloud server 6 by the client 20 may include, for example, the status information, the log information, and the like of the first type terminal device 3 subordinate to the client 20. As will be described later, in the first storage 63, a table (for example, a scheduled task table to be described later) corresponding to the first type terminal device 3 is generated individually for each first type terminal device 3 subordinate to the client 20. For example, as will be described later with reference to FIG. 5, the table includes three entities related to "log", "status", and "registration". The log information of the first type terminal device 3 is written into the "log" entity in the corresponding scheduled task table. The status information of the first type terminal device 3 is written into the "status" entity or the "registration" entity in the corresponding scheduled task table. In the present embodiment, the status information is written, for example, into the "registration" entity. For example, the master 10 and/or the client 20 may write, into the "registration" entity, data related to a registration status of the corresponding first type terminal device 3.

As will be described later, the client 20 also writes a final update time Tref when writing into the first storage 63 the status information acquired from the first type terminal device 3. The final update time Tref indicates a time at which the status information is acquired from the first type terminal device 3. The final update time Tref includes, for example, year, month, day, hour and minute. However, similarly to the master current time Tm described above, the final update time Tref may be represented in any form.

The final update time Tref does not necessarily need to be a time at a moment when the client 20 actually acquires the status information from the first type terminal device 3. The final update time Tref may be a time within a predetermined range including the time at which the status information is actually acquired, that is, a time within a range that may be substantially regarded (or may be handled), in a case where the master 10 manages the first type terminal device 3, as the time at which the status information is acquired. For example, a predetermined time from the time at which the status information is actually acquired until the status information is written into the first storage 63 may be set as the final update time Tref. For example, a time at which the status information is written into the first storage 63 may be set as the final update time Tref.

In the present embodiment, the client 20 writes a search start time Tst and a search end time Ten into the first storage 63. In the present embodiment, the search start time Tst and the search end time Ten are written, for example, into a client setting table shown in FIG. 6. Details of the search start time Tst and the search end time Ten will be described later.

In a case where the data written by the master 10 includes data indicating a task (for example, the update of the firmware described above) directed to the first type terminal device 3 subordinate to the client 20, the client 20 writes, into the first storage 63 of the cloud server 6, data indicating an execution result of the task. The data is also written into a table (for example, an instant task table to be described later) for writing the execution result of the task, which is individually provided for each first type terminal device 3.

The data written into the cloud server 6 by the second type terminal device 4 may include, for example, the status information, the log information, and the like of the second type terminal device 4. That is, in the first storage 63, similarly to the first type terminal device 3 described above, a table (for example, a scheduled task table illustrated in FIG. 5) corresponding to the second type terminal device 4 is generated for the second type terminal device 4. The status information of the second type terminal device 4 is written into a "status" entity and/or a "registration" entity in the corresponding scheduled task table.

In a case where the data written by the master 10 includes data indicating a task directed to the second type terminal device 4, the second type terminal device 4 writes, into the first storage 63 of the cloud server 6, data indicating an execution result of the task. Specifically, as in a case of the first type terminal device 3 described above, the data is also written into a table (for example, an instant task table) that is provided so as to write the execution result of the task of the second type terminal device 4.

The data read from the cloud server 6 by the master 10 includes, for example, various types of data written into the tables described above.

That is, the master 10 and each of the client 20 and the second type terminal device 4 do not directly communicate with each other. The master 10 indirectly issues various notifications or the like to the client 20 and the second type terminal device 4 or indirectly acquires various types of information from the client 20 and the second type terminal device 4 by writing the data into the cloud server 6 or reading the data from the cloud server 6 as necessary. The client 20 and the second type terminal device 4 also indirectly acquire the various notifications or the like from the master 10 or indirectly transmit to the master the various types of information related to the terminal device by writing the data into the cloud server 6 or reading the data from the cloud server 6 as necessary.

(1-3) Sequence Outline

Figure 4:
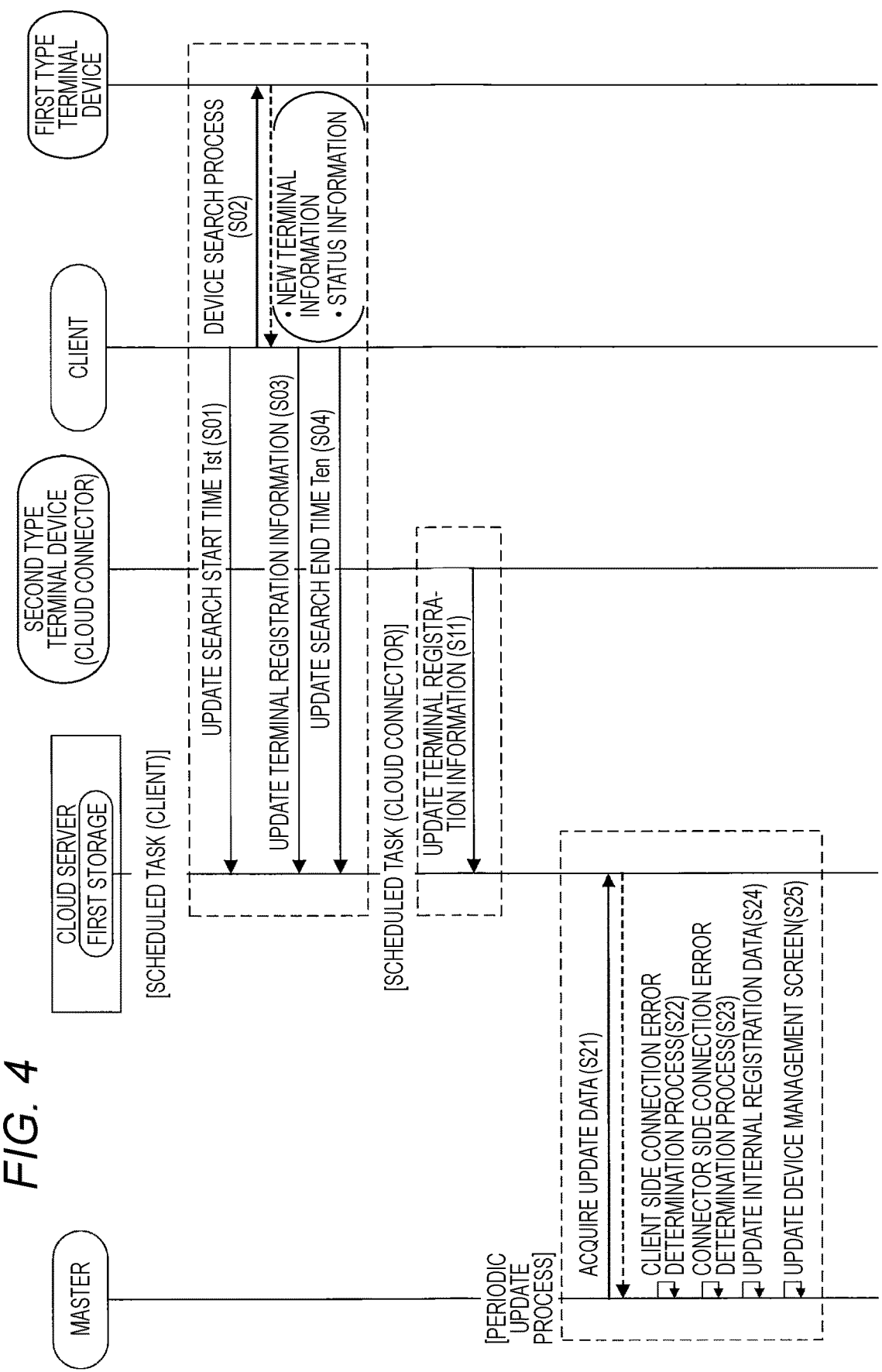
FIG. 4 is an explanatory diagram showing an example of a management sequence executed by the management system.

Subsequently, various operation examples related to management in the management system 1 will be schematically described with reference to FIG. 4. First, an example of a preparation stage for constructing the management system 1 will be described. An operation example in the preparation stage is not illustrated in FIG. 4.

In the preparation stage, the main management program 17 is installed in the master 10. As a result, in the master 10, a process is executed in accordance with the main management program 17. In the following description, the "master 10" basically means "the controller 11 that executes the main management program 17".

In the master 10, a cloud profile is set. Setting of the cloud profile includes setting a cloud parameter. In the client 20 and the second type terminal device 4, a polling operation for the cloud server 6 and an update operation of information stored in the cloud server 6 are executed as will be described later, and the update operation includes a scheduled task to be described later. The cloud parameter includes a cycle of the polling operation (hereinafter, referred to as a "polling cycle"), an execution cycle of the scheduled task (hereinafter, referred to as an "information update cycle"), and the like. The setting of the cloud profile further includes setting a shared access signature (SAS) for using the cloud service.

For example, the setting of the cloud profile is executed in accordance with a setting operation executed by the main administrator via the input unit 14. The SAS is individually set for each of the first storage 63 and the second storage 64, that is, each of the table storage and the object storage.

Subsequently, a part or the whole of the set cloud profile including the set cloud parameter is uploaded from the master 10 to the first storage 63 and written into the first storage 63. Specifically, the cloud parameter is written into the first storage 63 as an entity in a table.

In the master 10, at least a part of the cloud profile is further exported as a client profile, that is, data to be read by the client 20. The client profile may include, for example, the cloud parameter described above.

The exported client profile is provided to the client 20. The client profile may be provided to the client 20 by any method. For example, the client profile may be provided from the master 10 to the client 20 by using an e-mail, an easily portable storage medium, or the like.

A sub-administrator who is the user of the client 20 may operate the client 20 to install the sub-management program 27 in the client 20. At this time, the client profile provided from the master 10 is imported by an operation of the sub-administrator. As a result, the cloud parameter and the SAS according to the client profile are set in the client 20. In the following description, the "client 20" basically means "the controller 21 that executes the sub-management program 27".

By installation and setting described above, the client 20 may use the cloud server 6. That is, information may be transmitted between the client 20 and the master 10 via the cloud server 6. Specifically, the client 20 may execute, via the cloud server 6, relay operations between the master 10 and the first type terminal device 3, such as a task execution instruction from the master 10 to the first type terminal device 3, and transmission of the log information and the status information from the first type terminal device 3 to the master 10.

On the other hand, the SAS is registered in the second type terminal device 4 by an input operation performed by a device administrator who is an administrator of the second type terminal device 4. The controller 41 of the second type terminal device 4 in which the SAS is registered executes a process in accordance with the communication program 47. The controller 41 that executes the process in accordance with the communication program 47 is hereinafter referred to as a "cloud connector". The cloud connector refers to the cloud parameter written by the master 10 in the first storage 63 of the cloud server 6. The cloud connector acquires the cloud parameter and sets the cloud parameter in an own device.

In this way, initial setting of the client 20 and the second type terminal device 4 (cloud connector) including setting of the cloud parameter and the SAS is completed.

After the initial setting described above is completed, the client 20 and the cloud connector execute an initial registration process. Specifically, the client 20 searches for the first type terminal device 3 communicably connected to the client 20. Then, the searched first type terminal device 3 is registered in the client 20 itself and registered in the cloud server 6. Specifically, in the first storage 63, the scheduled task table is individually generated for each first type terminal device 3. Then, initial registration information is written into the scheduled task table. Thereafter, each time the scheduled task is executed, the client 20 and the cloud connector write, into the scheduled task table, various types of information including information acquired in the scheduled task.

As illustrated in FIG. 5, the scheduled task table includes a group of entities including a plurality of properties such as a first key, a second key, a request parameter, a response parameter, a notification source, a status, a device ID, and a time stamp.

As described above, the scheduled task table includes the three entities related to the "log", the "status", and the "registration" for each of the terminal devices 3 and 4. If a corresponding terminal device is the first type terminal device 3, information in each entity is updated by the client 20 to which the terminal device is subordinate, and if the corresponding terminal device is the second type terminal device 4, the information in each entity is updated by the cloud connector in the terminal device.

The property of the "notification source" in the entity indicates an updater of the entity, the property of the "notification source" is updated to a value "client" when the entity is updated by the client 20, and the property of the "notification source" is updated to a value "device" when the entity is updated by the cloud connector.

The entity related to the "log" is a log entity having a value "log" in the first key, and log information of a terminal device that corresponds to a device ID described as a value of the second key is described in the response parameter. The device ID is an ID unique to each of the terminal devices 3 and 4.

In a case where the corresponding terminal device is, for example, the printer or the digital multifunction device, the log information may include information on the total number of printed sheets of the terminal device. The log information may include, as a print history, information about a user who issues a print command and the number of printed sheets for each print job.

As illustrated in a lower part of FIG. 5, the response parameter may include, for example, JSON data. For example, the log information may be described in a JSON format so as to associate an object identifier (OD) used in a management information base (MIB) of a corresponding parameter with a value of the object identifier. A description of "x.x.x.x.x . . . " and "y.y.y.y.y . . . " in the lower part of FIG. 5 is an abstract representation showing an example of the object identifier.

The response parameter in an initial state before being updated may be present as a request parameter whose initial value is associated with the object identifier. According to an example in the lower part of FIG. 5, an initial value "% MIB(y.y.y.y.y . . . )%" associated with an OID "y.y.y.y.y . . . " is rewritten to a value "4" by updating.

The entity related to the "status" is a status entity having a value "status" in the first key, and status information of one terminal device that corresponds to the device ID described as the value of the second key is described in the response parameter. In a case where the corresponding terminal device is, for example, the printer or the digital multifunction device, the status information may include information about a remaining amount of a color material and error information such as a sheet jam of the corresponding terminal device. Similarly to the log entity, the response parameter may also be described in a JSON format in the status entity.

In the present embodiment, the status information is written into the "status" entity in the scheduled task table of the second type terminal device 4, and the status information is written into the "registration" entity in the scheduled task table of the first type terminal device 3. However, the entity into which the status information is written is not limited thereto.

The entity related to the "registration" is a registration entity having a value "registration" in the first key, and device information of one of the terminal devices 3 and 4 that corresponds to the device ID described as the value of the second key is described in the response parameter. In the response parameter, a plurality of item values that describe a basic configuration of a device are described as the device information. As described above, the status information is also written into the "registration" entity in the scheduled task table of the first type terminal device 3. The status information may also be written into the "registration" entity in the scheduled task table of the second type terminal device 4.

The entity in the scheduled task table of the second type terminal device 4 is updated by the corresponding cloud connector. The entity in the scheduled task table of the first type terminal device 3 is updated by the client 20 to which the first type terminal device 3 is subordinate. In the "registration" entity of the first type terminal device 3, identification information of the client 20 to which the first type terminal device 3 is subordinate is written as a part of the device information. The scheduled task table may include the data written by the master 10.

Each time contents of the corresponding entity are updated, a time at which the contents are updated is written into the property of the "time stamp". In the following description, the time stamp may mean the time written into the property. The time stamp is managed, for example, by the cloud server 6. That is, when any entity is updated, the cloud server 6 updates the time stamp in the entity.

In the initial registration process, the client 20 further generates the client setting table, for example, in the first storage 63 of the cloud server 6. An example of the client setting table is shown in FIG. 6. The client setting table includes a plurality of properties that are basically the same as those of the scheduled task table. The client setting table is mainly used to write the search start time Tst and the search end time Ten when the scheduled task is executed. The search start time Tst indicates a start time of the scheduled task. The search end time Ten indicates an end time of the scheduled task. That is, each time the scheduled task is executed, the search start time Tst and the search end time Ten are written into a "management status" property of the client setting table. Writing of the search start time Tst and the search end time Ten is performed by updating (that is, overwriting) the already written search start time Tst and the already written search end time Ten. Each of the search start time Tst and the search end time Ten includes, for example, year, month, day, hour and minute. However, similarly to the master current time Tm described above, the search start time Tst and the search end time Ten may be represented in any form.

After completing the initial registration process described above, each of the client 20 and the cloud connector periodically executes the scheduled task according to the set information update cycle. The initial registration process described above may be included in the scheduled task.

Specifically, the scheduled task includes a plurality of tasks having different execution cycles. Specifically, the scheduled task includes, for example, a first task of periodically acquiring the status information at the information update cycle and writing the status information into the scheduled task table, and a second task of periodically acquiring the log information and writing the log information into the scheduled task table. In the present embodiment, a description about the second task is omitted, and the first task is described in detail. That is, in the present embodiment, the "scheduled task" basically means the first task. The first task and the second task may be executed independently of each other.

First, the scheduled task executed by the client 20 will be specifically described with reference to FIG. 4. When a timing at which the scheduled task is to be executed arrives, the client 20 writes the search start time Tst into the client setting table (S01). The search start time Tst does not necessarily need to be an actual time at a moment when the scheduled task is started. The search start time Tst may be a time within a predetermined range including the time at which the scheduled task is actually started, that is, a time within a range that may be substantially regarded (or may be handled), in a case where the master 10 manages the client 20 and the subordinate first type terminal devices 3 thereof, as the time at which the scheduled task is started.

After writing the search start time Tst, the client 20 executes a device search process (S02). The device search process includes a first process of searching for the subordinate first type terminal devices 3 and a second process of acquiring the status information from each of the subordinate first type terminal devices 3. The first process is basically the same as the initial registration process described above. Specifically, the client 20 searches again for the first type terminal devices 3 communicably connected to the client 20. Then, in a case where there is the first type terminal device 3 that is not yet registered in the cloud server 6 among the searched first type terminal devices 3, the first type terminal device 3 is registered in the client 20 itself and registered in the first storage in the same manner as in the initial registration process.

After the device search process ends, the client 20 updates terminal registration information in the first storage 63 (S03). The terminal registration information is information related to each of the first type terminal devices 3 subordinate to the client 20, and includes, for example, at least the status information and the final update time Tref in the present embodiment. That is, in the present embodiment, instead of writing the status information and the final update time Tref each time the status information is acquired from one first type terminal device 3, these pieces of status information and the final update times Tref are written into the first storage 63 after acquisition of these pieces of status information from all the first type terminal devices 3 to be acquired is completed. In a case where the unregistered new first type terminal device 3 is searched for by the device search process, the terminal registration information also includes information necessary for registration of the new first type terminal device 3. In this case, a new scheduled task table is generated for the new first type terminal device 3, and the status information and the final update time Tref are written into the new scheduled task table.

In the device search process, in a case where there is the first type terminal device 3 whose status information is not able to be normally acquired among the subordinate first type terminal devices 3, the client 20 does not update the status information and the final update time Tref in the scheduled task table of the first type terminal device 3 in the first storage 63. Examples of a reason why the client 20 is not able to normally acquire the status information from the first type terminal device 3 include an abnormality in software in the client 20 or the first type terminal device 3, turning off of a power supply of the first type terminal device 3, a state where the client 20 and the first type terminal device 3 is not able to communicate with each other, and the like.

After updating of the terminal registration information in the first storage 63 (S03) is completed, the client 20 writes the search end time Ten into the client setting table (S04). The search end time Ten indicates a time at which the scheduled task ends, but does not necessarily need to be an actual time at a moment when the scheduled task ends (for example, a time at a moment when the updating of the terminal registration information is completed). The search end time Ten may be a time within a predetermined range including the time at which the updating of the terminal registration information is completed, that is, a time within a range that may be substantially regarded (or may be handled), in a case where the master 10 manages the client 20 and the subordinate first type terminal devices 3 thereof, as the time at which the updating of the terminal registration information is completed (and thus the scheduled task ends).

Next, the scheduled task executed by the cloud connector will be described. When a timing at which the scheduled task is to be executed arrives, the cloud connector updates terminal registration information in the first storage 63 (S11). The terminal registration information in this case is information related to the second type terminal device 4 in which the cloud connector is installed, and includes, for example, at least current status information of the second type terminal device 4 in the present embodiment.

Each of the client 20 and the cloud connector periodically and repeatedly executes the above scheduled task at the information update cycle.

The information update cycle may be updated by the master 10. That is, the master 10 may change the cloud parameter (including the information update cycle) uploaded to the first storage 63. On the other hand, each of the client 20 and the cloud connector refers to the cloud parameter in the first storage 63 at an appropriate timing (for example, periodically) even after setting the cloud parameter in a respective one of the client 20 and the cloud connector by the initial setting. When the cloud parameter in the first storage 63 is updated, updated contents are reflected in the cloud parameter in the respective one.

Although not illustrated, in the terminal devices 3 and 4, an instant task that is a non-periodic task other than the scheduled task may be executed based on a request from the master 10. The master 10 may cause a terminal device that is an execution target to execute the instant task by registering, in a predetermined entity (the instant task table described above) in the first storage 63, contents of the instant task and the terminal device that is the execution target.

Next, a periodic update process (S21 to S25) periodically executed by the master 10, for example, at a given cycle will be described. The periodic update process may be executed, for example, upon receiving a predetermined trigger such as an execution instruction operation executed by an administrator.

When an execution timing of the periodic update process arrives, the master 10 acquires update data from the first storage 63 (S21). Specifically, the update data includes registration information of each of the terminal devices 3 and 4 to be managed. Specifically, the registration information includes data (see FIG. 5) in the entities of the "log", the "status", and the "registration" in the table. The update data further includes information in the client setting table (FIG. 6), that is, at least the search start time Tst and the search end time Ten.

After acquiring the update data, the master 10 executes a client side connection error determination process (S22). The client side connection error determination process is a process of determining whether an error state related to the client 20 occurs.

The error state related to the client 20 includes, for example, a first connection error and a second connection error. The first connection error indicates a state where the client 20 and the cloud server 6 is not able to normally communicate with each other. The second connection error indicates a state where the client 20 and the first type terminal device 3 is not able to normally communicate with each other.

In a case where such an error state occurs, there is a possibility that at least one piece of the information of the first type terminal devices 3 included in the update data acquired in S21 is not proper information corresponding to an execution timing of a process of S21. That is, for example, in a case where the second connection error occurs between one first type terminal device 3 and the client 20, there is a possibility that the status information of the first type terminal device 3 is not able to be acquired, or even if the status information may be acquired, the status information is old information that is not updated by the most recent scheduled task. For example, in a case where the first connection error occurs, there is a possibility that these pieces of status information of all the first type terminal devices 3 subordinate to the client 20 is not able to be acquired, or even if these pieces of status information may be acquired, these pieces of status information are each old information that is not updated by the most recent scheduled task. That is, the status information acquired in a situation where the first connection error or the second connection error occurs may be low in reliability. Therefore, in the present embodiment, each time the status information is acquired by the periodic update process, it is determined whether the error state as described above occurs.

Figure 7:
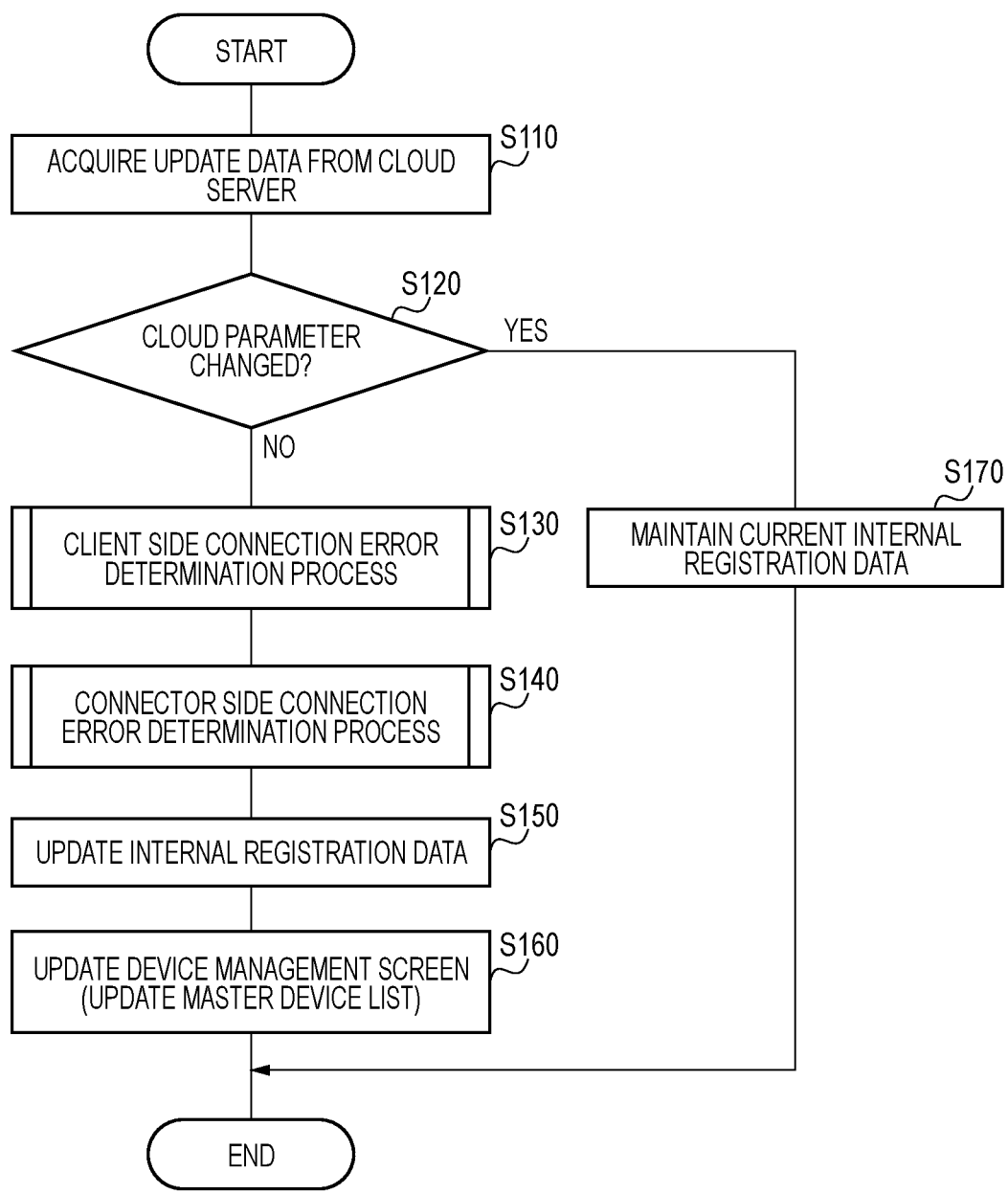
FIG. 7 is a flowchart of a periodic update process.

Details of the client side connection error determination process will be described later with reference to FIG. 7 (S130).

After executing the client side connection error determination process, the master 10 subsequently executes a connector side connection error determination process (S23). The connector side connection error determination process is a process of determining whether an error state related to the cloud connector occurs. The error state related to the cloud connector includes, for example, a state where the cloud connector and the cloud server 6 is not able to normally communicate with each other.

In a case where such an error state occurs in the cloud connector, there is a possibility that information corresponding to the cloud connector and included in the update data acquired in S21 is not proper information corresponding to the execution timing of the process of S21. That is, the status information acquired in a situation where such an error state occurs may be low in reliability. Therefore, in the present embodiment, each time the status information is acquired by the periodic update process, it is also determined whether the error state as described above occurs on a cloud connector side.

Details of the connector side connection error determination process will be described later with reference to FIG. 7 (S140).

After executing the connector side connection error determination process, the master 10 updates internal registration data (S24). Specifically, the master 10 updates the internal registration data based on the update data acquired in S21. The internal registration data includes the registration information of each of the terminal devices 3 and 4 to be managed and various types of other data necessary for management, which are stored by the master 10 itself.

Subsequently, the master 10 updates the device management screen (S25). That is, the internal registration data updated in S24 is reflected in the device management screen.

(1-4) Details of Periodic Update Process

Figure 8:
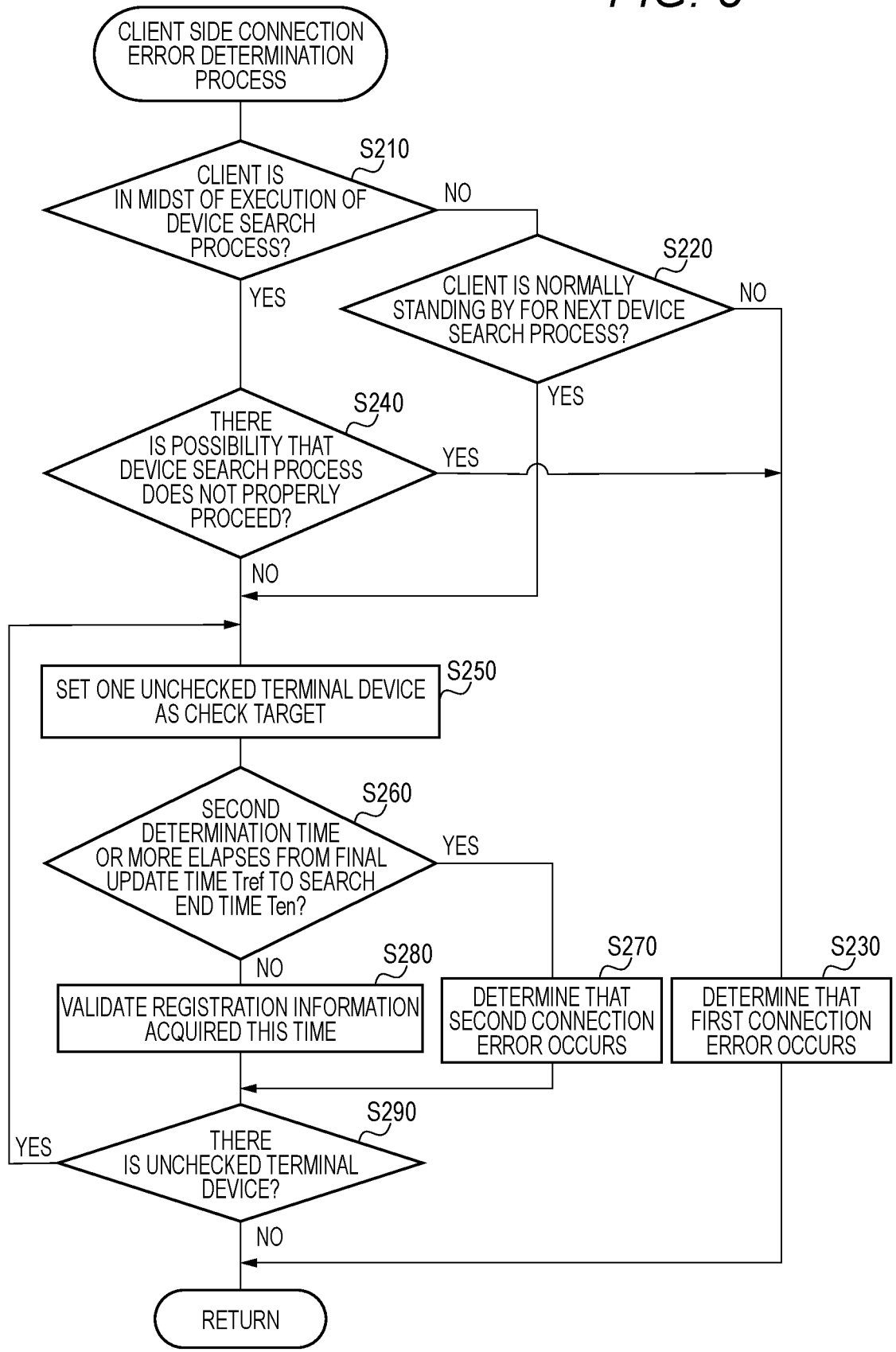
FIG. 8 is a flowchart of a client side connection error determination process.
Figure 9:
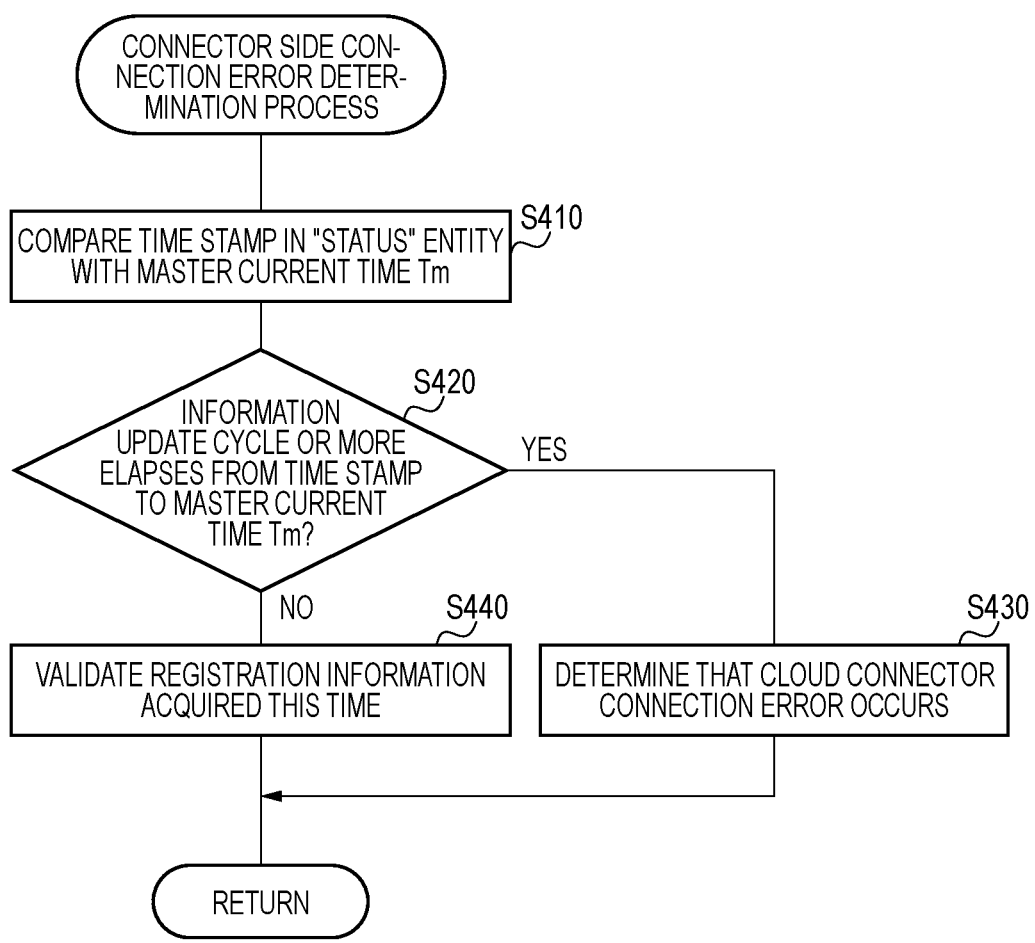
FIG. 9 is a flowchart of a connector side connection error determination process.

Details of the periodic update process executed by the master 10 will be described with reference to FIGS. 7 to 9.

The controller 11 (specifically, the CPU 11a) of the master 10 executes a program corresponding to the periodic update process in the main management program 17, so that the periodic update process is implemented. Each time the execution timing of the periodic update process arrives, the controller 11 executes the periodic update process.

When the periodic update process is started, the controller 11 acquires the update data from the cloud server 6 in S110. A process of S110 corresponds to the process of S21 in FIG. 4. That is, in S110, the registration information (including the status information and the final update time Tref) of each of the terminal devices 3 and 4 to be managed, the search start time Tst, the search end time Ten, and the like are acquired.

In S120, the controller 11 determines whether the cloud parameter written into the cloud server 6 is changed since execution of a previous periodic update process. If the cloud parameter is changed, the update data acquired in S110 this time is not validated, and the process proceeds to S170.

In S170, the controller 11 maintains current internal registration data. Basically, each time the periodic update process is executed, the master 10 updates the internal registration data based on the update data acquired in the periodic update process. However, if it is determined in S120 that the cloud parameter is updated, the update data acquired in a current periodic update process is not reflected in the internal registration data. After execution of S170, the controller 11 ends the periodic update process.

If it is determined in S120 that the cloud parameter is not updated, the controller 11 proceeds to S130. In S130, the controller 11 executes the client side connection error determination process. A process of S130 corresponds to a process of S22 in FIG. 4. The details of the client side connection error determination process are as shown in FIG. 8.

When the process proceeds to the client side connection error determination process, in S210, the controller 11 determines whether the client 20 is in a midst of execution of the device search process. In the present embodiment, the determination is executed, for example, based on the search start time Tst and the search end time Ten acquired in S110. Specifically, if the search start time Tst is ahead of the search end time Ten, the controller 11 determines that the client 20 is in the midst of the execution of the device search process (that is, the process is not completed yet). On the other hand, if the search start time Tst is not ahead of the search end time Ten, the controller 11 determines that the client 20 is not in the midst of the execution of the device search process.

If it is determined in S210 that the client 20 is not in the midst of the execution of the device search process, the controller 11 proceeds to S220. In S220, the controller 11 determines whether the client 20 is in a state (normal standby state) of normally standing by for execution of a next device search process. In the present embodiment, the determination is executed, for example, based on the master current time Tm and the search end time Ten acquired in S110. Specifically, if an elapsed time from the search end time Ten to the master current time Tm does not exceed the information update cycle, the controller 11 determines that the client 20 is in the normal standby state. On the other hand, if the elapsed time from the search end time Ten to the master current time Tm exceeds the information update cycle, the controller 11 determines that the client 20 is not in the normal standby state.

If it is determined that the client 20 is in the normal standby state, the controller 11 proceeds to S250. On the other hand, if it is determined that the client 20 is not in the normal standby state, the controller 11 proceeds to S230. In S230, the controller 11 determines that the first connection error occurs. That is, a determination process of S220 may be said to be a process of determining whether the first connection error occurs. After a process of S230, the client side connection error determination process ends, and the process proceeds to S140.

If it is determined in S210 that the client 20 is in the midst of the execution of the device search process, the controller 11 proceeds to S240. That is, if the client 20 is in the midst of the execution of the device search process, the determination process for the first connection error in S220 is avoided.

In S240, the controller 11 determines whether there is a possibility that the device search process currently being executed in the client 20 does not normally proceed. In the present embodiment, the determination is executed, for example, based on the master current time Tm and the search start time Tst acquired in S110. Specifically, if an elapsed time from the search start time Tst to the master current time Tm exceeds a first determination time, the controller 11 determines that there is a possibility that the device search process does not normally proceed. On the other hand, if the elapsed time from the search start time Tst to the master current time Tm is within the first determination time, the controller 11 determines that the device search process normally proceeds. The first determination time may be determined in any manner. The first determination time may be, for example, several tens of seconds.

If it is determined in S240 that there is a possibility that the device search process does not normally proceed, the controller 11 proceeds to S230, and determines that the first connection error occurs. If it is determined in S240 that the device search process normally proceeds, the controller 11 proceeds to S250. In S250 and subsequent steps, for each of the first type terminal devices 3 subordinate to the client 20, the controller 11 individually determines whether the second connection error occurs.

That is, in S250, the controller 11 sets one of the unchecked first type terminal devices 3 as a check target. Each of the unchecked first type terminal devices 3 means the first type terminal device 3 for which determination for the second connection error (that is, determination of S260) is not yet executed among the first type terminal devices subordinate to the client 20.

In S260, the controller 11 determines whether an elapsed time from the final update time Tref of the first type terminal device 3 that is the check target to the search end time Ten is equal to or longer than a second determination time. The process may be said to be a process of determining whether updating of terminal information of the first type terminal device 3 that is the check target is delayed.

If it is determined in S260 that the elapsed time from the final update time Tref to the search end time Ten is equal to or longer than the second determination time, the controller 11 proceeds to S270. In S270, the controller 11 determines that the second connection error occurs. That is, the controller 11 determines that the check target and the client 20 is not able to normally communicate with each other due to some reason and the updating of the terminal information of the check target is delayed. After a process of S270, the controller 11 proceeds to S290.

If it is determined in S260 that the elapsed time from the final update time Tref to the search end time Ten is less than the second determination time, the controller 11 proceeds to S280. In S280, the controller 11 validates registration information of the check target acquired in S110 this time. The registration information validated here is used as update information in S150 to be described later. After a process of S280, the controller 11 proceeds to S290.

In S290, the controller 11 determines whether there is the unchecked first type terminal device 3. If there is the unchecked first type terminal device 3, the process proceeds to S250. If there is no unchecked first type terminal device 3, the controller 11 ends the client side connection error determination process and proceeds to S140.

In S140, the controller 11 executes the connector side connection error determination process. A process of S140 corresponds to a process of S23 in FIG. 4. The connector side connection error determination process is executed individually for each second type terminal device 4 in a case where data of the second type terminal device 4 is included in the update data acquired in S110. The details of the connector side connection error determination process are as shown in FIG. 9.

When the process proceeds to the connector side connection error determination process, in S410, the controller 11 compares a time stamp in the "status" entity corresponding to the second type terminal device 4 that is a process target among the update data acquired in S110 with the master current time Tm. Then, in S420, it is determined whether an elapsed time from the time stamp to the master current time Tm is equal to or longer than the information update cycle. If the elapsed time from the time stamp to the master current time Tm is equal to or longer than the information update cycle, the process proceeds to S430. In S430, the controller 11 determines that a cloud connector error occurs. The cloud connector error corresponds to the error state related to the cloud connector described above, and includes, for example, a state where the cloud connector installed in the second type terminal device 4 that is the process target is not able to normally communicate with the cloud server 6.

If it is determined in S420 that the elapsed time from the time stamp to the master current time Tm is shorter than the information update cycle, the process proceeds to S440. In S440, the controller 11 validates the registration information of the second type terminal device 4 acquired in S110 this time. The registration information validated here is used as update information in S150 to be described later. After processes of S430 and S440, the controller 11 proceeds to S150.

In S150, the controller 11 updates the internal registration data based on the update data acquired in S110. In subsequent S160, the controller 11 updates the device management screen based on the internal registration data updated in S150. Processes of S150 and S160 correspond to S24 and S25 in FIG. 4.

In S150, more specifically, the controller 11 reflects (that is, overwrites and updates) the registration information validated in S280 or S440 in the internal registration data.

On the other hand, in a case where it is determined in S230 that the first connection error occurs, in S150, the controller 11 does not update data of each of the first type terminal devices 3 subordinate to the client 20, in the internal registration data. In this case, the controller 11 may associate and register, in each of the corresponding first type terminal devices 3, first error information indicating that it is determined that the first connection error occurs (and thus the data is not updated).

In a case where it is determined in S270 that the second connection error occurs, in S150, the controller 11 does not update data of the first type terminal device 3 for which it is determined that the second connection error occurs, in the internal registration data. In this case, the controller 11 may associate and register, in the corresponding first type terminal device 3, second error information indicating that it is determined that the second connection error occurs (and thus the data is not updated).

In a case where it is determined in S430 that the cloud connector connection error occurs, in S150, the controller 11 does not update data of the second type terminal device 4 for which it is determined that the cloud connector connection error occurs, in the internal registration data. In this case, the controller 11 may associate and register, in the second type terminal device 4, third error information indicating that it is determined that the cloud connector connection error occurs (and thus the data is not updated).

In S160, if no error is determined in S130 and S140, the controller 11 reflects, on the device management screen, an updated result obtained in S150. For example, the log information and the status information displayed on the device management screen are updated to contents updated in S150. On the other hand, if the error is determined in S230, S270, or S430, display contents related to the corresponding terminal device are not updated. Alternatively, information that is not updated may be hidden, or an image object indicating that the error is determined may be displayed. After a process of S160, the controller 11 ends the periodic update process.

(1-5) Effects of First Embodiment

According to the first embodiment described above, the cloud server 6 passively functions relative to the master 10 and the client 20. Therefore, an operation cost of the cloud server 6 may be reduced.

Further, in a case where the master 10 acquires the update data from the cloud server 6 by the periodic update process, the master 10 executes determination of various error states based on the acquired update data. As a result, if an error state occurs, the master 10 may take an appropriate measure according to the error state. For example, whether the acquired update data is validated may be appropriately determined based on whether the error state occurs. As a result, the master 10 may properly manage the terminal devices 3 and 4 to be managed.

In the present embodiment, the master 10 corresponds to an example of a first communication device in the present disclosure. The client 20 corresponds to an example of a second communication device in the present disclosure. The first type terminal device 3 corresponds to an example of a terminal device in the present disclosure. The cloud server 6 corresponds to an example of a cloud storage in the present disclosure. The status information, the search start time Tst, and the search end time Ten correspond to an example of execution information in the present disclosure. The information update cycle of the status information corresponds to an example of a given cycle in the present disclosure. The search start time Tst corresponds to an example of a process start time in the present disclosure. The search end time Ten corresponds to an example of a process end time in the present disclosure. The master current time Tm corresponds to an example of a current time in the present disclosure. The final update time Tref corresponds to an example of an information acquisition time in the present disclosure.

Processes of S01, S03, and S04 correspond to an example of a writing process in the present disclosure. A process of S02 corresponds to an example of a terminal information acquisition process in the present disclosure. Processes of S21 and S110 correspond to an example of an execution information acquisition process in the present disclosure. A process of S210 corresponds to an example of an execution possibility determination process and a midst-of-acquisition determination process in the present disclosure. Processes of S220, S240, and S260 correspond to an example of an error determination process in the present disclosure. In particular, S220 corresponds to an example of a first determination process in the present disclosure, S240 corresponds to an example of a second determination process in the present disclosure, and S260 corresponds to an example of a third determination process in the present disclosure. The main management program 17 corresponds to an example of a management program in the present disclosure.

2. OTHER EMBODIMENTS

Although the embodiment of the present disclosure has been described above, the present disclosure is not limited to the embodiment described above and may be implemented in various modifications.

For example, a specific method for each of determinations in S210, S220, S240, and S260 is not limited to the method described above, and other methods that may achieve an object of the determination may be used. For example, in S260, if an elapsed time from the final update time Tref to the master current time Tm is equal to or longer than the second determination time, it may be determined that the second connection error occurs.

In the above embodiment, an example has been described in which the master 10 determines various connection errors based on a result of the scheduled task of mainly acquiring the status information in the client 20 and the cloud connector. In contrast, the master 10 may determine various connection errors based on a result of a task different from the above scheduled task. For example, various connection errors may be determined based on a result of a scheduled task of acquiring log information and writing the log information into the first storage 63, a result of the instant task described above, or the like.

The first storage 63 is not limited to the NoSQL data store. For example, the first storage 63 may be an SQL database such as a relational database.

The second type terminal device 4 may be provided in at least one of the first base and the second base. The third base may be provided with the same network system as that in the second base, that is, the client 20 and the first type terminal device 3. A plurality of network systems the same as the second base may be present in the management system 1.

A plurality of functions of one component in the above embodiment may be implemented by a plurality of components, or one function of one component may be implemented by a plurality of components. A plurality of functions of a plurality of components may be implemented by one component, or one function to be implemented by a plurality of components may be implemented by one component. A part of a configuration of the above embodiment may be omitted. At least a part of the configuration of the above embodiment may be added to or replaced with a configuration of another embodiment.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A management system comprising:
a first communication device configured to access a cloud storage; and
a second communication device configured to access the cloud storage and at least one of terminal devices,
wherein the second communication device is configured to execute:
a terminal information acquisition process of acquiring, from each of the at least one of terminal devices, terminal information related to the terminal devices; and
a writing process of writing execution information into the cloud storage in response to execution of the terminal information acquisition process, the execution information including the terminal information acquired by the terminal information acquisition process and being related to the terminal information acquisition process, and
wherein the first communication device is configured to execute:
an execution information acquisition process of acquiring, from the cloud storage, the execution information written into the cloud storage; and
an error determination process of determining whether an error state occurs based on the execution information acquired by the execution information acquisition process, the error state being a state where there is a possibility that one piece of the terminal information of the at least one of the terminal devices included in the execution information acquired by the execution information acquisition process does not correspond to an execution timing of the execution information acquisition process, and
wherein the second communication device is configured to repeatedly execute the terminal information acquisition process at a given cycle,
wherein the writing process in the second communication device is configured to rewrite the execution information written into the cloud storage to new execution information each time the terminal information acquisition process is executed, the new execution information corresponding to the terminal information acquisition process executed this time.

2. The management system according to claim 1,
wherein the first communication device is further configured to execute an execution possibility determination process of determining, based on the execution information acquired by the execution information acquisition process, whether the management system is in an executable state where the error determination process is properly executable, and
wherein the first communication device is configured to avoid execution of the error determination process in a case where the execution possibility determination process determines that the management system is not in the executable state.

3. The management system according to claim 1,
wherein the execution information further includes a process end time of the terminal information acquisition process, and
wherein the error determination process includes a first determination process of determining that the error state occurs in a case where an elapsed time from the process end time included in the execution information to a current time in the first communication device exceeds the given cycle.

4. The management system according to claim 3
wherein the first communication device is configured to execute a midst-of-acquisition determination process of determining, in a case where the execution information is acquired by the execution information acquisition process, whether the second communication device is in a midst of execution of the terminal information acquisition process, and
wherein the first communication device is configured to avoid execution of the first determination process in a case where the midst-of-acquisition determination process determines that the second communication device is in the midst of the execution.

5. The management system according to claim 4,
wherein the execution information further includes a process start time of the terminal information acquisition process, and
wherein the midst-of-acquisition determination process determines that the second communication device is in the midst of the execution in a case where the process start time included in the execution information acquired by the execution information acquisition process is ahead of the process end time included in the execution information acquired by the execution information acquisition process.

6. The management system according to claim 5,
wherein the error determination process includes a second determination process of determining that the error state occurs in a case where an elapsed time from the process start time included in the execution information to the current time in the first communication device exceeds a first determination time.

7. The management system according to claim 1,
wherein the second communication device is configured to repeatedly execute the terminal information acquisition process at a given cycle,
wherein the writing process in the second communication device is configured to rewrite the execution information written into the cloud storage to new execution information each time the terminal information acquisition process is executed, the new execution information corresponding to the terminal information acquisition process executed this time,
wherein the execution information further includes a process end time of the terminal information acquisition process,
wherein the terminal information of each of at least one terminal device written into the cloud storage by the writing process includes an information acquisition time at which the terminal information is acquired by the terminal information acquisition process,
wherein the writing process in the second communication device is configured to avoid rewriting of the terminal information of the at least one terminal device in the cloud storage in a case where there is the at least one terminal device whose terminal information has not been acquired by the terminal information acquisition process, and
wherein the error determination process includes a third determination process of determining that the error state occurs in a case where there is the at least one terminal device in which an elapsed time from the information acquisition time to the process end time is equal to or longer than a second determination time.

8. The management system according to claim 1,
wherein the second communication device is configured to repeatedly execute the terminal information acquisition process at a given cycle,
wherein the first communication device is configured to change the given cycle, and
wherein the first communication device is configured to, in at least first execution of the execution information acquisition process after the given cycle is changed, avoid execution of the error determination process based on the execution information acquired by the execution information acquisition process.

9. A non-transitory computer readable medium storing a management program configured to be executed by a computer included in a first communication device in a system, the system including the first communication device and a second communication device that are configured to access a cloud storage,
wherein the management program causes the computer to execute:
acquiring, from the cloud storage, execution information written into the cloud storage, the execution information being written into the cloud storage by a writing process in the second communication device in response to execution of an acquisition process of acquiring, from each of at least one of terminal devices, terminal information related to the terminal devices by the second communication device, and the execution information being related to the acquisition process and including the acquired terminal information, the acquisition process being repeatedly executed at a given cycle, and
determining whether an error state occurs based on the acquired execution information, the error state being a state where there is a possibility that one piece of the terminal information of the at least one of the terminal devices included in the execution information acquired by the execution information acquisition process does not correspond to an execution timing of the execution information acquisition process,
wherein the writing process in the second communication device is configured to rewrite the execution information written into the cloud storage to new execution information each time the acquisition process is executed, the new execution information corresponding to the acquisition process executed this time.

10. A method for managing at least one of terminal devices via a cloud storage and a second communication device by a first communication device, the first communication device being configured to access the cloud storage, and the second communication device being configured to access the cloud storage,
wherein the second communication device is configured to write execution information into the cloud storage in response to execution of an acquisition process of acquiring, from each of the at least one of the terminal devices, terminal information related to the at least one of terminal devices, the execution information being related to the acquisition process and including the acquired terminal information,
wherein the method comprises:
an execution information acquistion process comprising acquiring, from the cloud storage, the execution information written into the cloud storage; and
determining whether an error state occurs based on the execution information acquired from the cloud storage, and
wherein the error state is a state where there is a possibility that one piece of the terminal information of the at least one of the terminal devices included in the acquired execution information does not correspond to an execution timing of the execution information acquisition process,
wherein the second communication device is configured to repeatedly execute the execution information acquisition process at a given cycle, and to rewrite the execution information written into the cloud storage to new execution information each time the execution information acquisition process is executed, the new execution information corresponding to the execution information acquisition process executed this time.

* * * * *